United States Patent [19]

Tanaka et al.

[11] Patent Number: 4,673,053
[45] Date of Patent: Jun. 16, 1987

[54] FRAME-REAR SUSPENSION ASSEMBLY FOR A MOTORCYCLE AND THE LIKE

[75] Inventors: Osami Tanaka; Tomoyuki Tagami; Kazuhiko Tsunoda, all of Saitama, Japan

[73] Assignee: Honda Giken Kogyo Kabushiki Kaisha, Tokyo, Japan

[21] Appl. No.: 813,695

[22] Filed: Dec. 27, 1985

[30] Foreign Application Priority Data

Dec. 28, 1984 [JP] Japan .................. 59-196994[U]
Dec. 28, 1984 [JP] Japan .................. 59-196995[U]

[51] Int. Cl.⁴ ............................................. B62K 25/04
[52] U.S. Cl. ...................................... 180/227; 280/284
[58] Field of Search ............... 280/688, 689, 690, 697, 280/701, 284; 180/227, 219

[56] References Cited

U.S. PATENT DOCUMENTS

| | | | |
|---|---|---|---|
| 4,440,413 | 4/1984 | Miyakoshi et al. | 180/227 |
| 4,489,803 | 12/1984 | Fukuchi | 180/227 |
| 4,506,755 | 3/1985 | Tsuchida | 180/227 |
| 4,515,236 | 5/1985 | Kanamori | 180/227 |
| 4,574,909 | 3/1986 | Ribi | 180/227 |

*Primary Examiner*—Richard A. Bertsch
*Attorney, Agent, or Firm*—Irving M. Weiner; Joseph P. Carrier; Pamela S. Burt

[57] ABSTRACT

There is disclosed a frame-rear suspension assembly for a motorcycle and the like which comprises a frame including right and left tubular members, a rear fork pivotally connected to the right and left tubular members and a cross member made of a light alloy and provided between the right and left tubular members, and a rear-suspension system including a spring-loaded damper with one end pivotally connected to the frame, and link means for connecting the other end of the spring-loaded damper to the rear fork. The cross member is detachably connected between the right and left tubular members and the link means is connected to the cross member.

7 Claims, 10 Drawing Figures

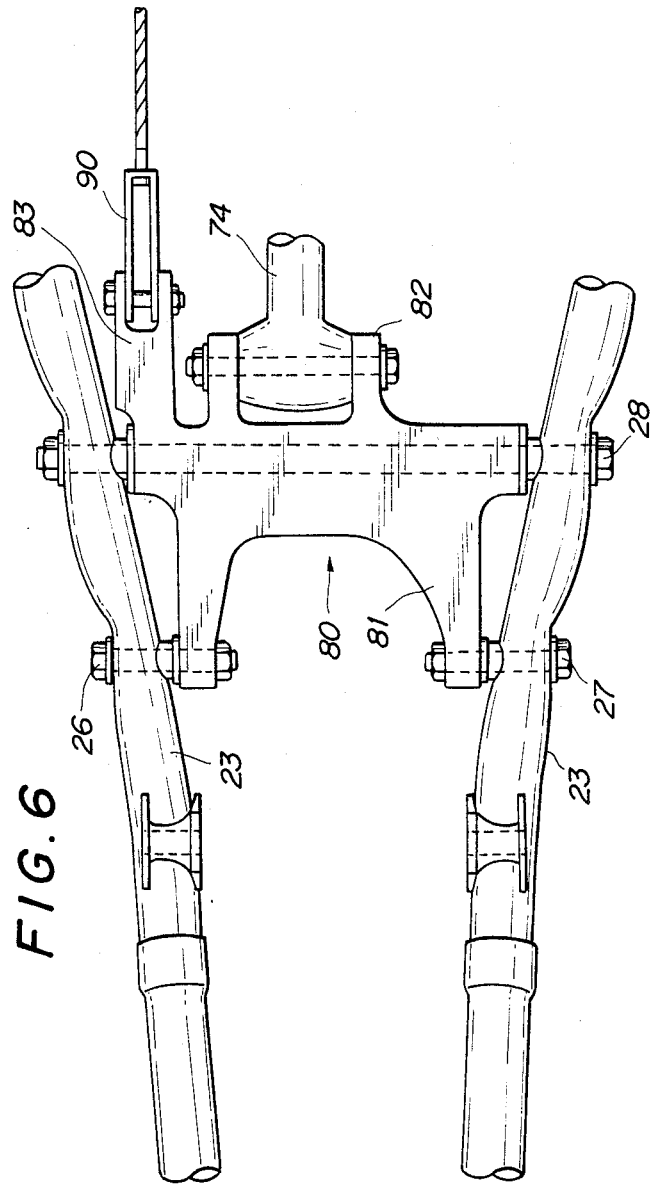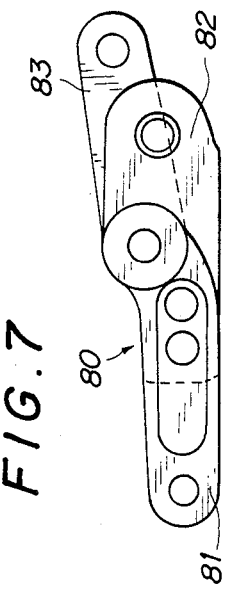

FRAME-REAR SUSPENSION ASSEMBLY FOR A MOTORCYCLE AND THE LIKE

BACKGROUND OF THE INVENTION

1. Field of the Invention

The present invention relates to an improvement in a frame-rear suspension assembly for use in a motorcycle and the like.

2. Description of the Related Art

In known frame-rear suspension assemblies, for instance, as disclosed in U.S. Pat. No. 4,489,803 issued to Fukuchi on Dec. 25, 1984 and U.S. Pat. No. 4,506,755 issued to Tsuchida et al on Mar. 26, 1985, a spring-loaded damper is pivotally connected at its upper end to brackets extending rearwardly from the upper portion of a frame adjacent a rear wheel, and at its lower end to a cross member fixedly mounted to the frame through a link mechanism. In this arrangement, the brackets and cross member are welded to the frame. It is for this reason that when shock absorbing characteristics need to be changed, an appropriate frame has to be newly manufactured. Further, such welding operation is cumbersome and thus, costly. Still further, the frame per se is made of steel and inevitably, the brackets and cross member also have to be made of steel for welding purposes. It is desired that such brackets and cross member be made of materials lighter than steel so as to reduce the weight of a motorcycle frame.

SUMMARY OF THE INVENTION

It is, therefore, a primary object of the present invention to provide a frame-rear suspension assembly for a motorcycle and the like wherein various shock absorbing characteristics may be obtained by changing the ratio of the swinging motion of one link to that of the other link.

It is another object of the invention to provide a frame-rear suspension assembly for a motorcycle and the like wherein a cross member and a bracket may be made of a light alloy to reduce the weight of a motorcycle frame.

It is a further object of the invention to provide a frame-rear suspension assembly which enables the the structure of a motorcycle frame to be simplified.

According to a first embodiment of the present invention, a frame-rear suspension assembly for a motorcycle and the like comprises a frame including right and left tubular members, a rear fork pivotally connected to said right and left tubular members and a cross member provided between said right and left tubular members, and a rear suspension system including a spring-loaded damper with one end pivotally connected to said frame and link means for connecting the other end of said spring-loaded damper to the rear fork. Said cross member is detachably connected between said left and right tubular members and said link means is connected to the cross member.

According to a second embodiment of the present invention, a frame-rear suspension assembly for a motorcycle and the like comprises a frame including right and left tubular members having a bracket and a cross member provided therebetween and a rear fork pivotally connected to said right and left tabular members, and a rear suspension system including a spring-loaded damper with one end pivotally connected via said bracket to said right and left tubular members, and link means for connecting the other end of said spring-loaded damper to said rear fork. A reinforcing member is fixedly mounted on said frame and said bracket is detachably mounted to said reinforcing member. Said link means is pivotally connected to said cross member.

Further objects and advantages of the invention will be more apparent from the following detailed description when taken in conjunction with the accompanying drawings.

BRIEF DESCRIPTION OF THE DRAWINGS

FIG. 6 is an enlarged bottome view showing the manner in which a cross member is bolted to right and left tubular members;

FIG. 7 is a side view of the cross member of FIG. 8;

DETAILED DESCRIPTION OF THE PREFERRED EMBODIMENT

Figure 1:
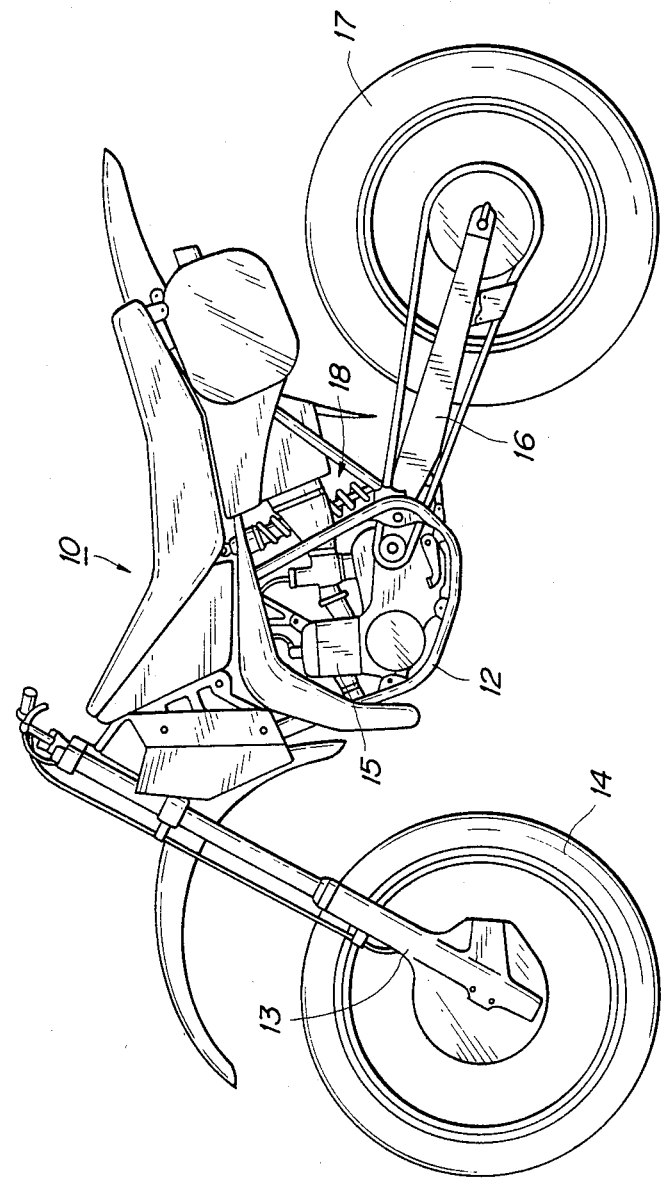
FIG. 1 is a diagrammatic view of a motorcycle.

Referring firstly to FIG. 1 of the drawings, there is illustrated diagrammatically a motorcycle which generally includes a frame 12, a front fork 13 mounted at the front of the frame 12, a front wheel 14 carried in the front fork 13, an engine unit 15 mounted in the frame 12, a rear fork 16 pivotally connected to the frame 12, a rear wheel 17 carried in the rear fork 16, and a rear suspension system 18.

Figure 2:
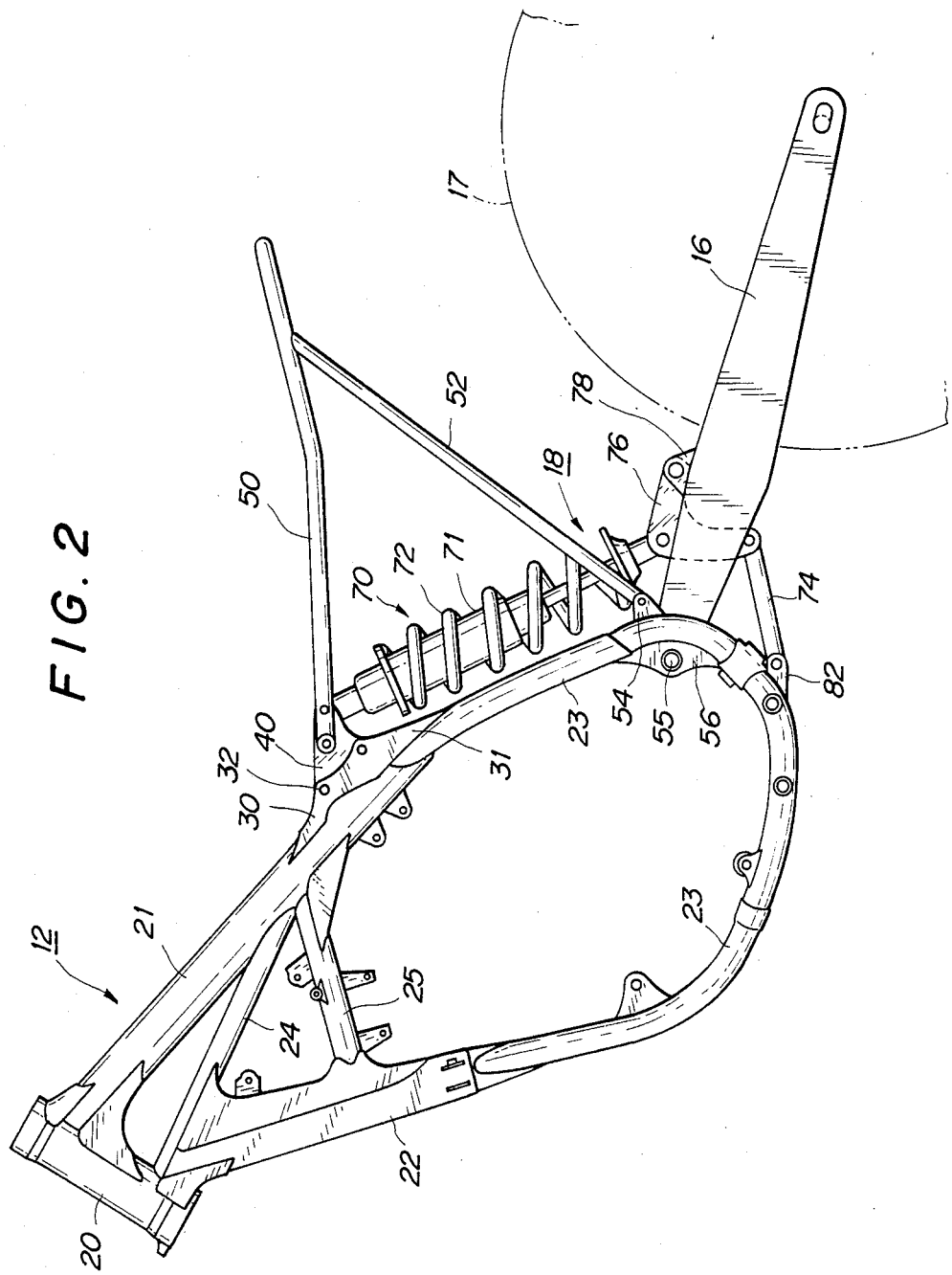
FIG. 2 is a side view of a frame-rear suspension assembly according to a first embodiment of the present invention.
Figure 3:
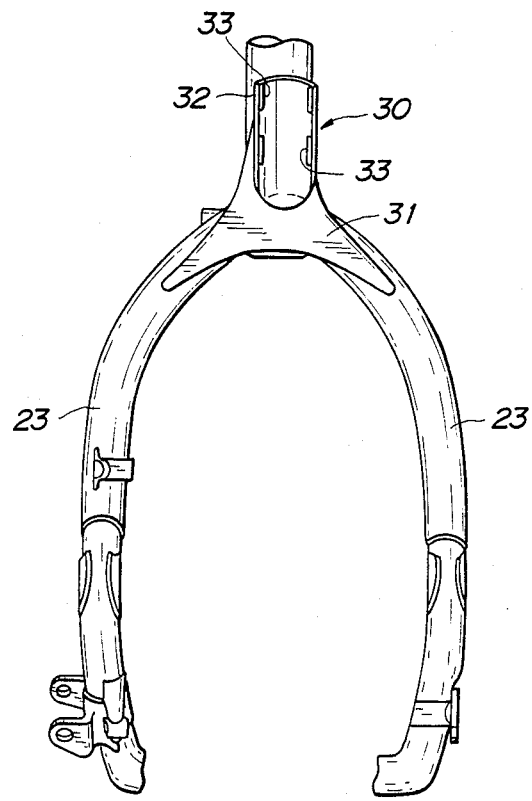
FIG. 3 is an enlarged plan view of a reinforcing member shown in FIG. 2.

FIG. 2 through FIG. 7 illustrate a first embodiment of the present invention. In FIG. 2, the frame 12 includes a steering head 20, a main pipe 21 extending rearwardly and downwardly from the upper portion of the steering head 20, and a downtube 22 extending generally downwardly from the lower portion of the steering head 20. Joined to the lower ends of the main pipe 21 and the downtube 22 are generally U-shaped right and left tubular members 23, 23. A pair of horizontal tubular members 50 extend rearwardly from the upper portion of the frame 12. A corresponding pair of triangulating tubular members 52 extend forwardly and downwardly from the rearwardly generally horizontally extending tubular members 50 and are connected to brackets 54 projecting rearwardly from the lower portions of the right and left tubular members 23, 23 of the frame 12 adjacent the rear wheel 17. The rear fork 17 is journalled to a pivot pin 5 affixed to brackets 56. Further, a first subtube 24 extends between the steering head 20 and the main pipe 21 with its longitudinal axis perpendicular to the axis of the steering head 20. Also, a second subtube 25 extends between the main pipe 21 and the downtube 22 with its longitudinal axis perpendicular to the axis of the downtube 22.

A reinforcing member 30 is of a bifurcated shape at its rear as generally indicated at 31 when viewed in plan, and is fixedly mounted on a region wherein the main pipe 21 is joined to the upper portions of the right and left tubular members 23, 23. The reinforcing member 30 is formed at its upper portion with apertures 32 for connection with a bracket which will be explained in the following paragraph. Reference numeral 33 denotes plate members attached on the inside of the upper portion of the reinforcing member 30 corresponding to the apertures 32.

Figure 4:
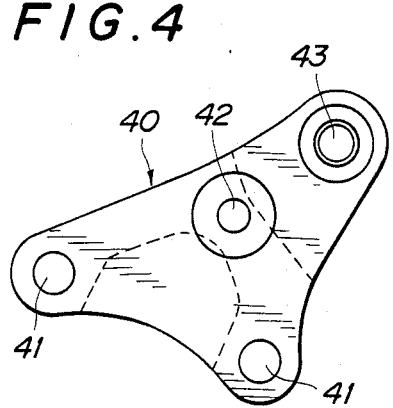
FIG. 4 is an enlarged side view of a bracket shown in FIG. 2.
Figure 5:
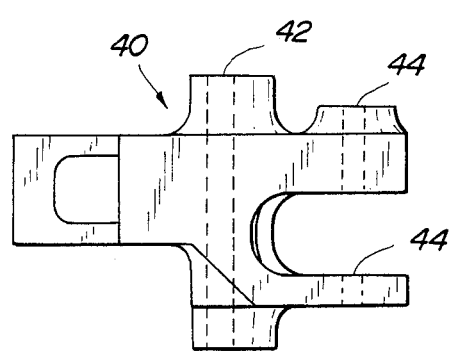
FIG. 5 is a plan view of the bracket of FIG. 4.

In FIG. 4 and FIG. 5, a generally triangular bracket 40 is made of light alloy such as aluminum and the like. The bracket 40 is formed at its lower portion with apertures 41. The bracket 40 is bolted to the reinforcing member 30 upon alignment of the apertures 41 of the bracket 40 with the apertures 32 of the reinforcing member 30. A through hole 42 is formed centrally of the bracket 40 and the horizontal tubular members 50 are bolted to the bracket 40 upon alignment of the through hole 42 with apertures (not shown) formed therein. The upper portion of the bracket 40 is formed with a bifurcated portion as particularly shown in FIG. 5, and through holes 44, 44 are formed therein. A spring-loaded damper which will be described hereinbelow, is journalled at its upper end to a pivot pin 43 affixed to the upper portion of the bracket 40. It will be appreciated that with this arrangement, the desired shock absorbing characteristics may readily be obtained by changing the configuration and/or location of the bracket 40.

Referring again to FIG. 2, the rear suspension system 18 includes a spring-loaded damper 70 having a shock absorber 71 and a coil spring 72 surrounding the shock absorber 71, a first link 74 in the form of a rod and a second link 76 in the form of a bell crank. The second link 76 is pivotally connected at one end to the first link 74 and at the other end to brackets 78 extending upwardly from the rear fork 16. As shown, the lower end of the spring-loaded damper 70 is pivotally connected to the second link 76.

As shown in detail in FIG. 6, a cross member 80, which is made of a light alloy such as aluminum and the like, is integral with a first bracket 81 at the front portion thereof, and a second bracket 82 and a third bracket 83 at the rear portion thereof. The first bracket 81 is bolted at 26, 27 and 28 to the lower portions of the right and left tubular members 23, 23. Pivotally connected to the second bracket 82 is the first link 74 of the rear suspension system. It will be appreciated that with this arrangement, various shock absorbing characteristics may be obtained by changing the configuration of the first and second brackets and thus the ratio of the swinging motion of one link to that of the other link. Reference numeral 90 denotes a torque rod for a brake (not) shown which is pivotally connected to the third bracket 83.

Figure 8:
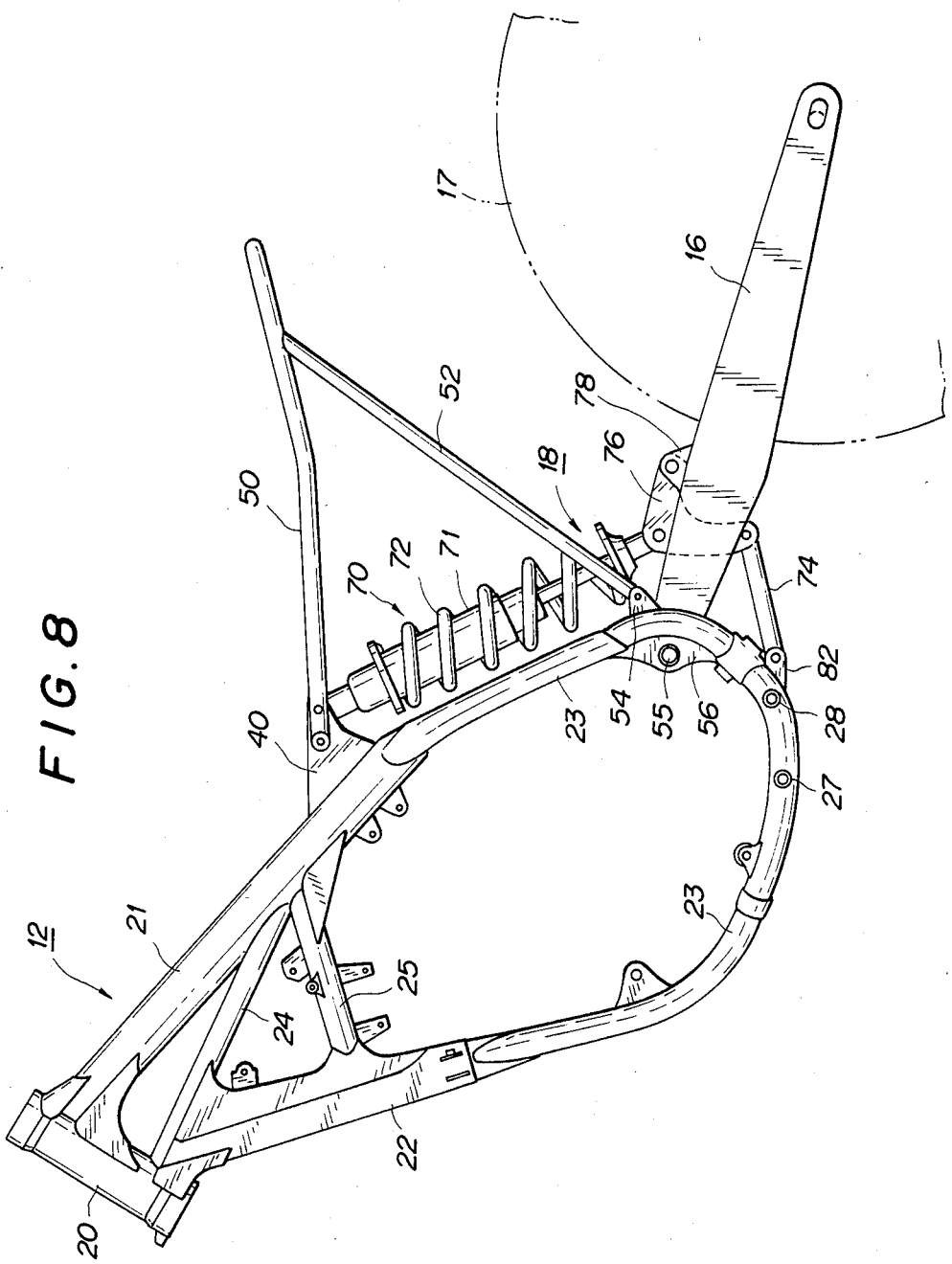
FIG. 8 is a side view showing a modified form of the frame-rear suspension assembly of FIG. 2.

FIG. 8 illustrates a modified form of the first embodiment of the present invention. Namely, the bracket 40 is directly and fixedly mounted on the frame 12. It will be appreciated, however, that various shock absorbing characteristics may likewise be obtained by changing the configuration of the first and second links of the cross member 80.

Figure 9:
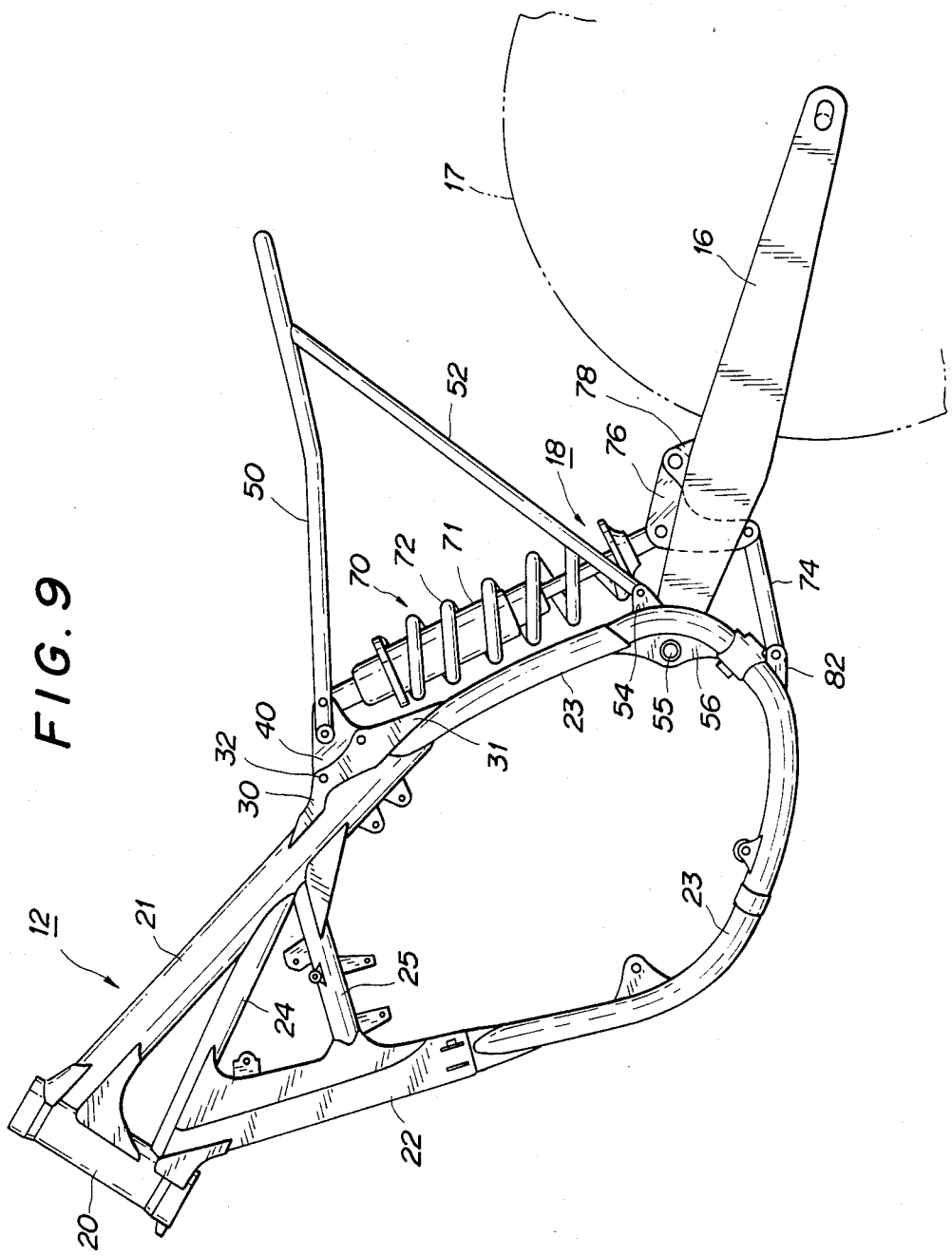
FIG. 9 is a side view of a frame-rear suspension assembly according to a second embodiment of the present invention.
Figure 10:
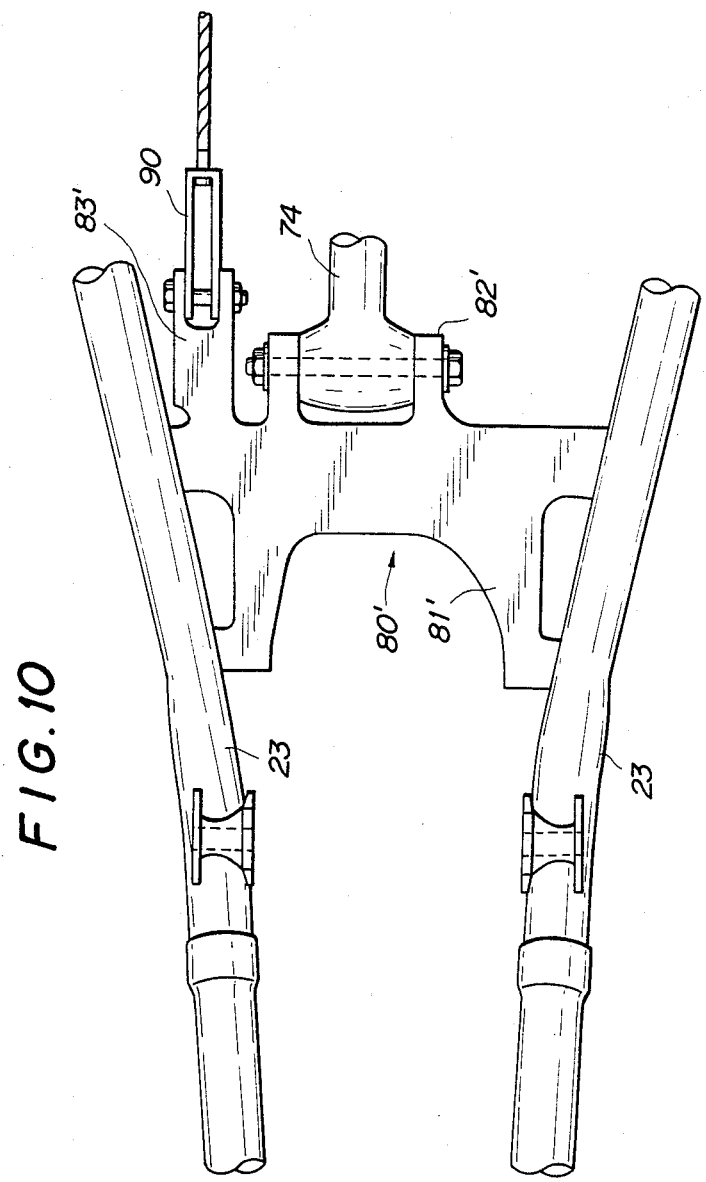
FIG. 10 is an enlarged bottom view showing the manner in which a cross member is welded to the right and left tubular members.

FIG. 9 and FIG. 10 illustrate a second embodiment of the present invention. The reinforcing member 30 is fixedly mounted on the frame 12 and the bracket 40 is bolted to the reinforcing member 30 in the same manner as shown in the first embodiment of the invention. On the other hand, a cross member 80' is welded to the right and left tubular members 23', 23'. The cross member 80' has a first bracket 81' at its front portion and a second bracket 82' and a third bracket 83' at its rear portion. The first link 74 is pivotally connected to the second bracket 82' and the torque rod 90 is connected to the third bracket 83'. It will be appreciated, however, that various shock absorbing characteristics may likewise be obtained by changing the configuration and/or location of the bracket 40.

It will be apreciated that the present invention is applicable to three-wheel or four wheel vehicles, and that the invention may be otherwise embodied within the scope of the following claims.

What is claimed is:

1. A frame-rear suspension assembly for a motorcycle and the like comprising a frame including right and left tubular members, a rear fork pivotally connected to said right and left tubular members and a cross member provided between said right and left tubular members, and a rear suspension system including a spring-loaded damper with one end pivotally connected to siad frame, and link means for connecting the other end of said spring-loaded damper to said rear fork, said cross member being detachably connected between siad right and left tubular members and said link means being connected to said cross member.

2. A frame-rear suspension assembly according to claim 1, wherein said cross member is made of a light alloy and is bolted to said right and left tubular members of the frame.

3. A frame-rear suspension assembly according to claim 1, wherein a reinforcing member is fixedly mounted on said frame and a bracket is detachably connected to said reinforcing member, said spring-loaded damper being pivotally connected at said one end to the frame via said bracket.

4. A frame-rear suspension assembly according to claim 3, wherein said bracket is made of a light alloy and is bolted to said reinforcing member.

5. A frame-rear suspension assembly according to claim 1, wherein said link means comprises a first link in the form of a rod and a second link in the form of a bell crank, siad first link being pivotally connected at one end to said cross member, and said second link being pivotally connected at one end to said rear fork while being pivotally connected to the other end of the spring-loaded damper.

6. A frame-rear suspension assembly for a motorcycle and the like comprising a frame including right and left tubular members having a bracket and a cross member provided therebetween and a rear fork pivotally connected to said right and left tubular members, and a rear suspension system including a spring-loaded damper with one end pivotally connected via said bracket to said right and left tubular members, and link means for connecting the other end of said spring-loaded damper to said rear fork, said link means being pivotally connected to said cross member, wherein a reinforcing member is fixedly mounted on said frame and said bracket is detachably mounted to said reinforcing member.

7. A frame-rear suspension assembly according to claim 6, wherein said bracket is made of a light alloy and is bolted to said reinforcing member.

* * * * *

UNITED STATES PATENT AND TRADEMARK OFFICE
CERTIFICATE OF CORRECTION

PATENT NO. : 4,673,053

DATED : June 16, 1987

INVENTOR(S) : Osami TANAKA et al.

It is certified that error appears in the above-identified patent and that said Letters Patent is hereby corrected as shown below:

```
Column 1, line 44, delete "the" (first occurrence).
Column 2, line 18, after "FIG. 2;" begin new paragraph
for "FIG. 5 is a plan view of the bracket of FIG. 4;";
          line 19, correct the spelling of --bottom--;
          line 22, change "FIG. 8" to --FIG. 6--;
          line 60, change "5" to --55--.
Column 3, line 53, change "(not) shown" to --(not shown)--.
Column 4, line 12, change "four wheel" to --four-wheel--;
Claim 1, line 7, (column 4, line 22), correct the spelling
of --said--.
Claim 1, line 10, (column 4, line 25), correct the spelling
of --said--.
Claim 5, line 4, (column 4, line 44), correct the spelling
of --said--.
```

Signed and Sealed this

Twenty-fourth Day of November, 1987

Attest:

DONALD J. QUIGG

*Attesting Officer*  *Commissioner of Patents and Trademarks*